(12) United States Patent
Oliver et al.

(10) Patent No.: US 7,681,249 B2
(45) Date of Patent: Mar. 23, 2010

(54) CONDITIONING GARMENTS

(75) Inventors: Paul Oliver, Denbyshire (GB); Peter C. Gordon, Liverpool (GB)

(73) Assignee: Survitec Group Limited, Birkenhead, Merseyside (GB)

( * ) Notice: Subject to any disclaimer, the term of this patent is extended or adjusted under 35 U.S.C. 154(b) by 482 days.

(21) Appl. No.: 10/592,674

(22) PCT Filed: Dec. 9, 2004

(86) PCT No.: PCT/GB2004/005191

§ 371 (c)(1),
(2), (4) Date: Sep. 13, 2006

(87) PCT Pub. No.: WO2005/058081

PCT Pub. Date: Jun. 30, 2005

(65) Prior Publication Data

US 2007/0136922 A1  Jun. 21, 2007

(30) Foreign Application Priority Data

Dec. 17, 2003  (GB) .................................. 0329250.5

(51) Int. Cl.
*A41D 1/04* (2006.01)
(52) U.S. Cl. .......................................... 2/102; 62/259.3
(58) Field of Classification Search .............. 2/102, 2/69, 69.5, 456, 2.5; 62/3.5, 259.3
See application file for complete search history.

(56) References Cited

U.S. PATENT DOCUMENTS

| | | | |
|---|---|---|---|
| 3,289,748 A | 12/1966 | Jennings | |
| 3,570,264 A | * 3/1971 | Curtis | ................ 62/259.3 |
| 4,738,119 A | 4/1988 | Zafred | |
| 5,438,707 A | 8/1995 | Horn | |

FOREIGN PATENT DOCUMENTS

| | | |
|---|---|---|
| DE | 201 10 984 U1 | 12/2001 |
| FR | 2 805 340 | 8/2001 |
| GB | 2 243 988 | 11/1991 |
| GB | 2 274 239 | 7/1994 |
| GB | 2 367 478 | 4/2002 |
| WO | WO 83/02562 | 8/1983 |
| WO | WO 02/29348 | 4/2002 |
| WO | WO 03/106897 | 12/2003 |

* cited by examiner

*Primary Examiner*—Tejash Patel
(74) *Attorney, Agent, or Firm*—Stites & Harbison PLLC; Douglas E. Jackson (57) ABSTRACT

A conditioning garment has front and rear panels (11, 12) with a neck opening (13) between them. A manifold (17) extends along the lower edge of the front (11) panel and a manifold (24) extends along the lower edge of the rear panel (12). Tubes (27) extend between the manifolds (17, 24) and carry conditioned liquid over the torso of a wearer to heat/cool the torso. The tubes (27) are equally spaced and generally the same length to provide even heating/cooling. The garment (10) is easy to don and remove. The garment (10) can be modified by the addition of various chest compression devices, a neck support and a harness tensioning device. All these are designed to encounter increased +G-forces on the body of a wearer.

22 Claims, 8 Drawing Sheets

CONDITIONING GARMENTS

The invention relates to conditioning garments.

Conditioning garments are used to heat or cool all or part of the body of a wearer. A conditioning garment covering a torso of a wearer comprises front and rear panels with a neck opening therebetween, two manifolds and tubes extending between the manifolds over the panels for the passage of fluid through the tubes between the manifolds. In this way, heated or cooled liquid is supplied to one of the manifolds, which forms an inlet manifold, and then passes from the manifold to the tubes over the torso of a wearer to the other of the manifolds which thus forms an outlet manifold.

According to a first aspect of the invention there is provided a conditioning garment for covering a torso of a wearer comprising front and rear panels with a neck opening therebetween, each panel having a lower edge and a manifold extending across the panel in the region of the lower edge, and a plurality of tubes extending between the manifold over the panels for the passage of fluid through the tubes between the manifolds.

According to a second aspect of the invention there is provided a conditioning garment for covering a torso of a wearer comprising front and rear panels with a neck opening therebetween, two manifolds, tubes extending between the manifolds over the panels for the passage of fluid through the tubes between the manifolds and a chest compression device carried by the garment for compressing the chest of a wearer at increased +G-forces.

According to a third aspect of the invention, there is provided a conditioning garment for covering a torso of a wearer comprising front and rear panels with a neck opening therebetween, two manifolds, tubes extending between the manifolds over the panel for the passage of fluid through the tubes between the manifolds and a neck support for supporting a neck of a wearer.

According to a fourth aspect of the invention there is provided a conditioning garment for covering a torso of a wearer comprising front and rear panels with a neck opening therebetween, two manifolds, tubes extending between the manifolds over the panels for the passage of fluid through the tubes between the manifolds and a harness tensioning device for increasing tension in a harness worn by a wearer of the garment.

The following is a more detailed description of some embodiments of the invention, by way of example, reference being made to the accompanying drawings in which.

Figure 1:
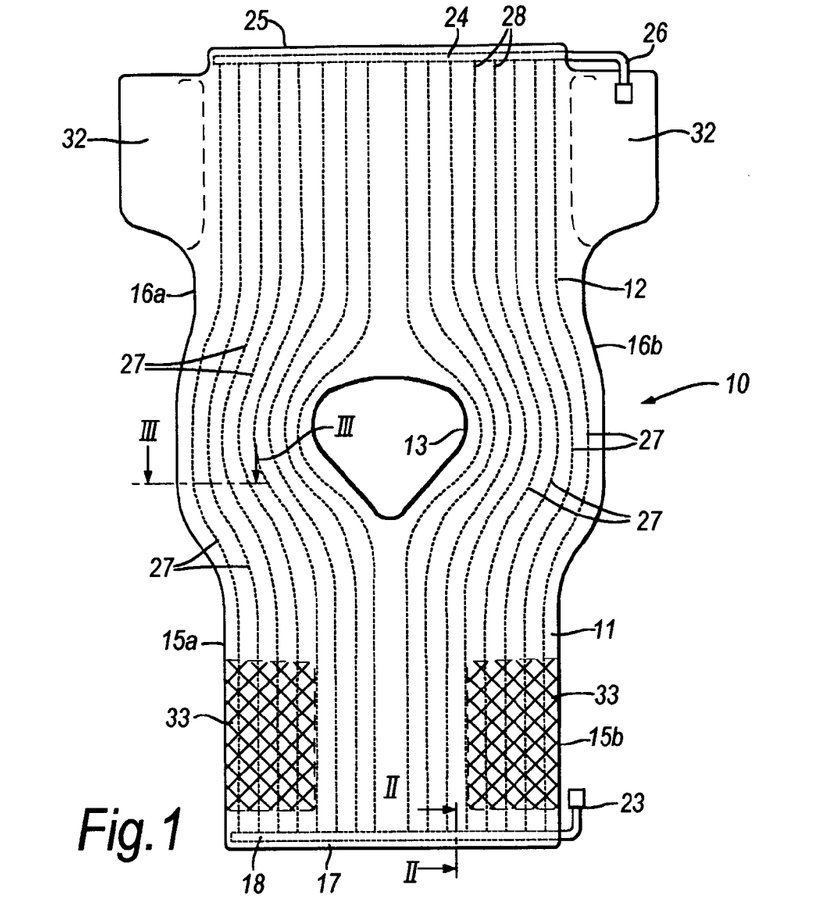
FIG. 1 is a plan view of a conditioning garment.
Figure 3A:
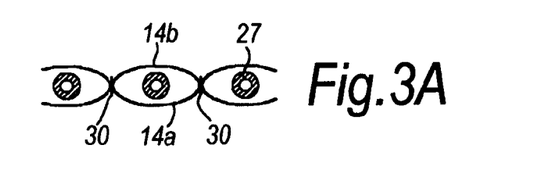
FIGS. 3a, 3b and 3c are alternative cross-sections on the line 111-III of FIG. 1.
Figure 3B:
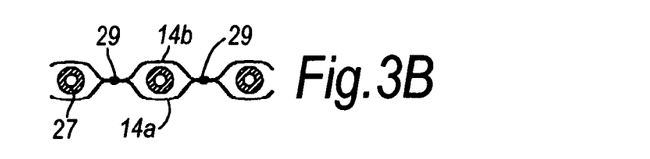
Figure 3C:
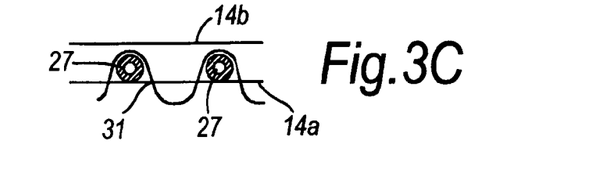

Referring first to FIG. 1, the conditioning garment 10 is a one-piece member including a front panel 11 and a rear panel 12 with a neck opening 13 between the front panel 11 and the rear panel 12. The conditioning garment 10 is formed, as seen in FIGS. 3A, 3B and 3C, by an inner layer of material 14a and an outer layer of material 14b. One of the layers is an inextensible material. The front panel 11 and the rear panel 12 have respective side edges 15a 15b and 16a 16b.

Figure 2:
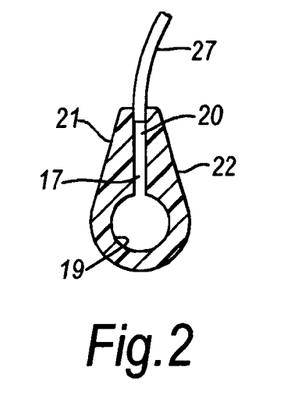
FIG. 2 is a cross-section on the line II-II of FIG. 1.

A first manifold 17 is located along a lower edge 18 of the front panel 11 and extends across the whole width of the front panel 11 between the side edges 15a, 15b of the front panel 11. As seen in FIG. 2, the manifold 17 is formed from a moulded plastics material with a central passage 19 and a plurality of ports, one of which is shown at 20. The first manifold 17 has an outer face 21 and an inner face 22. As seen in FIG. 2, the inner face is generally flat to allow the first manifold 17, which is flexible, to conform and lie against the body of a wearer. The passage 19 is closed at one end, and at the other end, leads to a terminal connection 23. This will be described in more detail below.

A second manifold 24, constructed and arranged similarly to the first manifold 17, extends across a lower edge 25 of the rear panel 12. The second manifold 24 has a terminal connection 26.

A plurality of tubes 27 extend between the first manifold 17 and the second manifold 24 across the front panel 11 and the rear panel 12 of the conditioning garment 10. Each tube 27 is connected to a respective port 20 of the first manifold 17 and respective port 28 of the second manifold 24. As seen in FIG. 1, the ports 20 and 28 are generally equidistantly spaced across the associated manifold 17, 24.

As also seen in that Figure, the tubes 27 extend in paths between the first manifold 17 and the second manifold 24 that have initially straight portions and then curve around the neck opening 13. The straight portions each have a length that is more than 50% of the length of the associated panel 11, 12. The tubes are generally parallel to one another and, in addition, the tubes 27 are all of generally the same length.

The tubes 27 are located relative to the conditioning garment 10 and three possible modes of location are shown in FIGS. 3A, 3B and 3C. In FIG. 3A, the inner layer 14a and the outer layer 14b are stitched together along stitching lines 30 to form pockets with a tube 27 being arranged in each pocket to locate the tube 27 relative to the conditioning garment 10. In FIG. 3B, the pockets are formed by lines of heat welding 29. In FIG. 3C, stitching 31 is provided over the tubes 27 to connect the tubes 27 to the inner layer 14a. In all of these ways, the tubes 27 are held in fixed positions relative to one another and relative to the conditioning garment 10.

The side edges 16a, 16b of the rear panel 12 are provided with respective projecting flaps 32. These flaps 32 carry touch-close pads. Co-operating touch-close pads 33 extend inwardly from the side edges 15a, 15b of the front panel 11 towards the lower edge 18 of the front panel 11.

Figure 4:
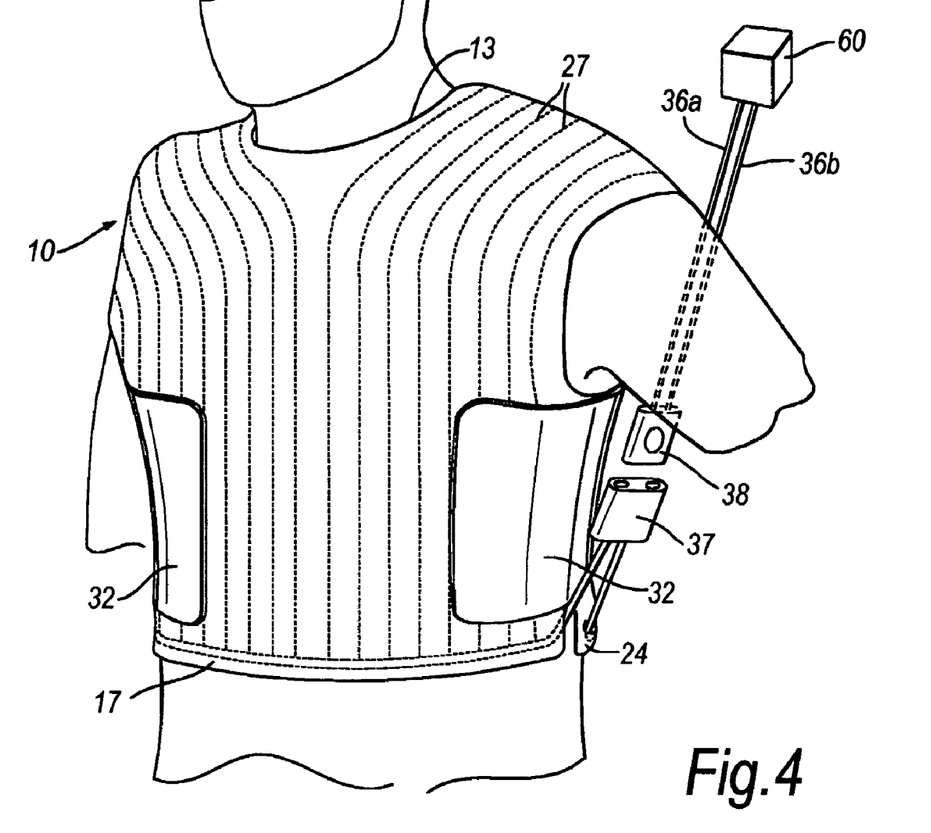
FIG. 4 is a front view of the conditioning garment of FIG. 1 worn by a person and showing a terminal connector.

The conditioning garment is easily fitted by passing a head of a wearer through the neck opening 13 and arranging the rear panel 12 over a rear of a torso of the wearer and the front panel 11 over the front of the torso of the wearer. The flaps 32 can then be engaged with the pads 33 to close the garment around the sides of a wearer. This is seen in FIG. 4.

Figure 5:
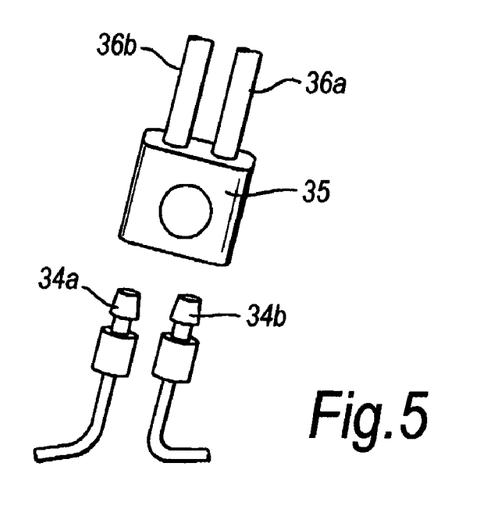
FIG. 5 shows an alternative terminal connector.
Figure 6:
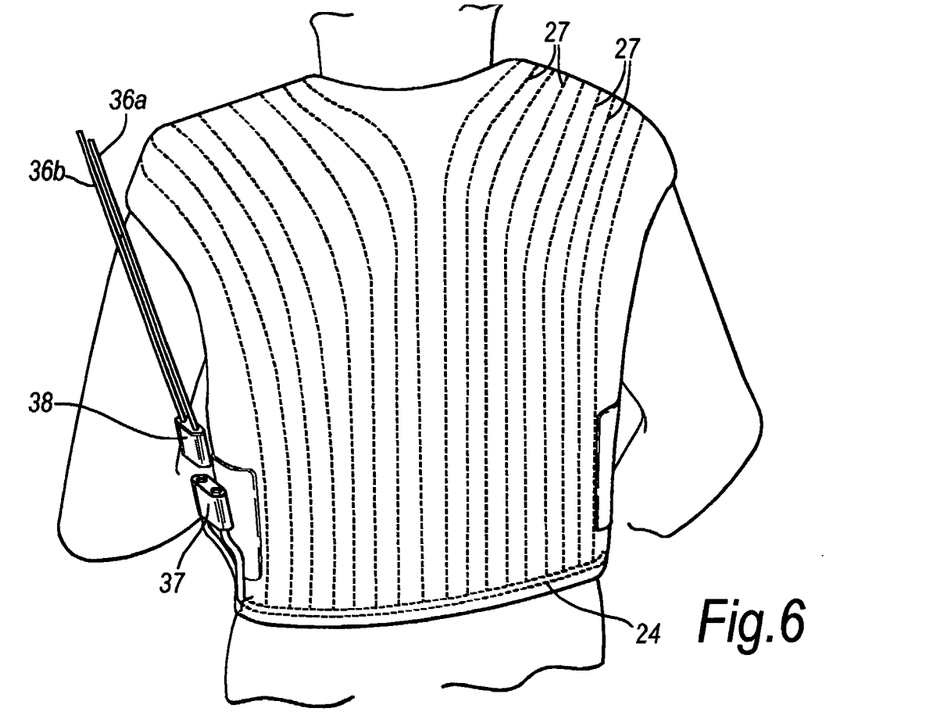
FIG. 6 is a similar view to FIG. 4 but from the rear of a person.
Figure 7:
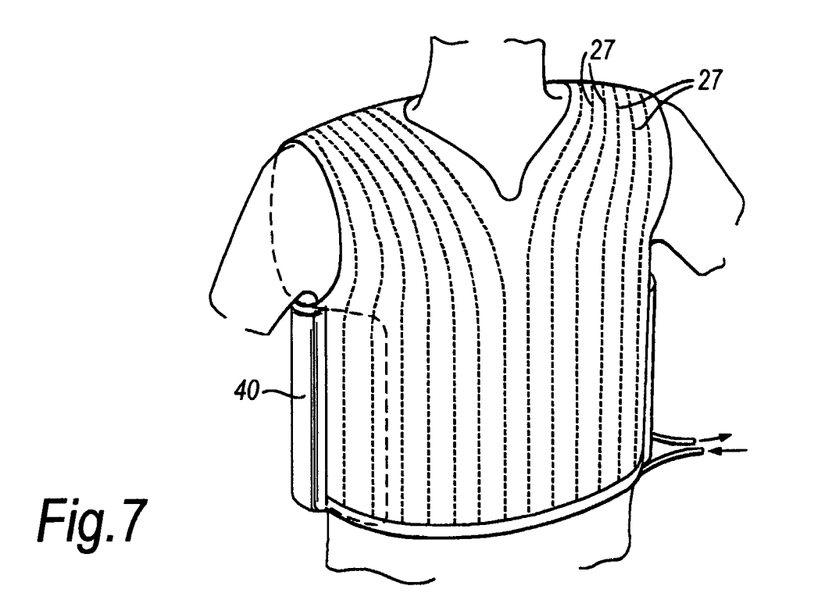
FIG. 7 is a similar view to FIG. 4 but showing the conditioning garment modified by the addition of a first form of chest compression device.

Referring to FIG. 5, the terminal connectors 23, 26 include male connectors 34a, 34b that plug into a block 35 including female connections (not shown) connecting to respective supply and drain tubes 36a, 36b. As an alternative, as shown in FIG. 4, the two terminal connections 23, 26 may meet in a block 37 including respective female connectors and connect to male connectors 38 leading to the supply tube 36a and the drain tube 36b.

The conditioning garment 10 can be used to either to heat or, more commonly, to cool a wearer. For heating, heated liquid is supplied through the supply tube 36a and for cooling, cooled liquid is supplied through the supply tube 36a from a source of heated/cooled liquid 60. The liquid passes to the first manifold 17, which thus forms an inlet manifold, and vents through the ports 20 to pass through the tubes 27 over the torso of a wearer before leaving through the ports 28, the second manifold 24, which thus acts as an outlet manifold, the terminal connector 26 and the drain tube 36b.

The conditioning garment 10 described above with reference to the drawings has a number of advantages. It can be easily donned and removed using the flaps 32 and the pads 33. The connection to the supply tube 36a and the drain tube 36b is easy and convenient. The regular spacing of the tubes 27 across the garment 10, particularly at the manifold 17, 24, means that there are no points on the torso of the wearer where heating/cooling is concentrated. The fact that the tubes 27 are of similar length means that the heating/cooling is even over the torso of the wearer since similar amounts of heat are lost or gained through the tubes 27 along their lengths There are a number of modifications that may be made to the garment described above with reference to the drawings.

It is not necessary for both sides of the garment to be openable. Accordingly, one side of the garment 10 may be closed permanently and this is preferably the side where the terminal connections 23, 26 are located. It has been found that the garment 10 can still be easily donned with just one side openable. The closures need not use touch-close material. Any suitable form of fastening may be used such as buckles or straps.

Another possibility is to have both sides permanently closed.

The location of the terminal connections 23, 26 at one side of the garment 10 is to allow the terminal connections 23, 26 to communicate with a particular heating/cooling system provided in a particular aircraft. For other aircraft, it may be necessary to locate the terminal connections 23, 26 elsewhere. For example, the terminal connections may be located on the front panel 11 adjacent the lower edge 18.

Figure 8:
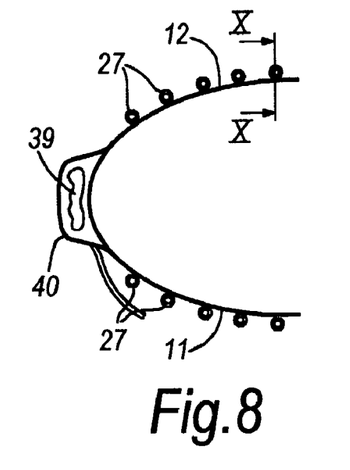
FIG. 8 is a partial cross-section through the conditioning garment of FIG. 7 with the chest compression device in an inoperative position.
Figure 9:
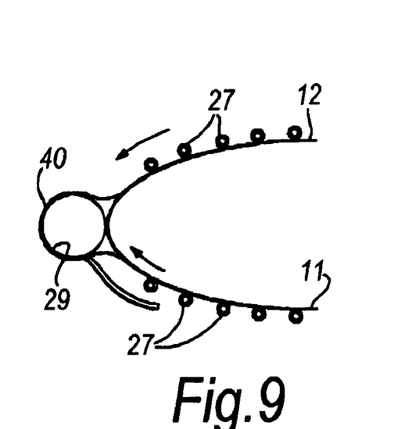
FIG. 9 is a similar view to FIG. 8 but with the chest compression device in an operative position.

Referring next to FIGS. 7, 8, 9, 10 and 11, a first modified form of the conditioning garment 10 includes a first form of chest compression device. Such a device restricts the tendency of the chest wall to expand. This may occur with positive pressure breathing either under elevated +G-forces or at high altitudes. The problem is greater at high altitudes due to the double effect of increased air supply pressure and decreased surrounding pressure. Decreased surrounding pressure may also arise in emergencies such as loss of cabin pressure. The device is in the form of a closed tube 39 arranged in a pocket 40 at one side of the garment 10. The tube 39 is filled with gas under such pressure that, at sea level, the tube has a relatively collapsed disposition. At lower surrounding pressures, the gas in the tube 39 expands and the tube 39 moves from the configuration as shown in FIG. 8 to the expanded configuration shown in FIG. 9 where the pocket 40 is distended to draw the side edges 15a, 16a of the front panel 11 and the rear panel 12 together and so tighten the garment 10 around the chest of the wearer. Such tightening can help the wearer lower surrounding pressures and the associated increased air supply pressure.

This garment, and the garment described above with reference to FIGS. 1 to 6, provide chest compression through the tubes 27. As described above, in use a liquid circulates through the tubes 27. This liquid has a mass and at elevated +G-forces the liquid will be forced down the tubes 27 and this will expand the tubes and compress the garment against the chest of a wearer to provide chest compression. This alone may be sufficient chest compression for elevated +G-forces.

Figure 10:
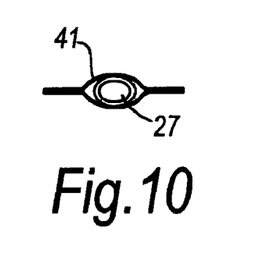
FIG. 10 is a section on the line X-X of FIG. 8 showing a tube for conditioning liquid in a collapsed disposition within an inextensible tube.
Figure 11:
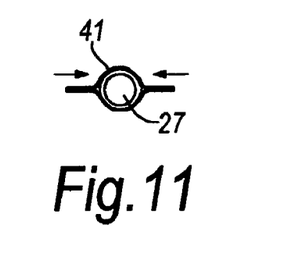
FIG. 11 is a similar view to FIG. 10 but showing the tube in an expanded disposition.

The compressive effect may be increased by making the tubes 27 expandable. In this case, as shown in FIGS. 10 and 11, such flexible tubes 27 may be surrounded by respective tubes 41 of inextensible material. When the tubes 27 are in their normal collapsed disposition, the inextensible tubes 41 elongate to increase the circumferential dimension of the front and back panels 11, 12. Under increased +G-forces, the tubes 27 expand as seen in FIG. 11, and conform the inextensible tubes 41 to a circular cross-section. This decreases the circumferential dimension of the front and back panels 11, 12 and so provides chest compression.

Figure 12:
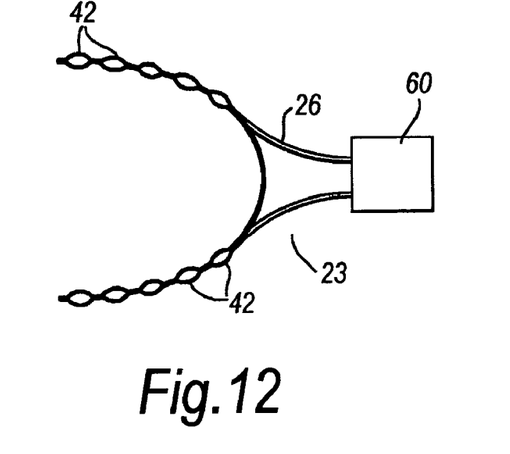
FIG. 12 is a partial cross-section through the conditioning garment of FIG. 7 showing a second form of chest compression device in an inoperative position.
Figure 13:
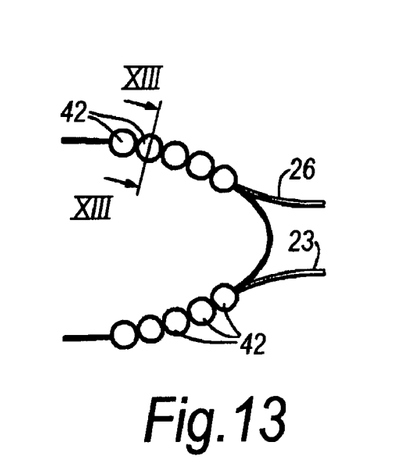
FIG. 13 is a similar view to FIG. 12 but showing the second form of chest compression device in an operative position.

A second form of chest compression device is shown in FIGS. 12 and 13. In these Figures, the device is formed by a plurality of pockets 41, with each pocket extending between an associated pair of conditioning tubes 27. Each pocket contains a respective closed tube 42 containing gas. At normal surrounding pressures, the closed tubes 42 have a smaller dimension but, as seen in FIG. 13, at decreased surrounding pressures, the gas in the closed tubes 42 expands to draw the tension of the inner and outer layers 14a, 15b so tightening the conditioning garment 10 around the torso of a wearer.

Of course, in both of these embodiments, as the surrounding pressure increases, the gas pressure reduces so releasing the compression.

Figure 14:
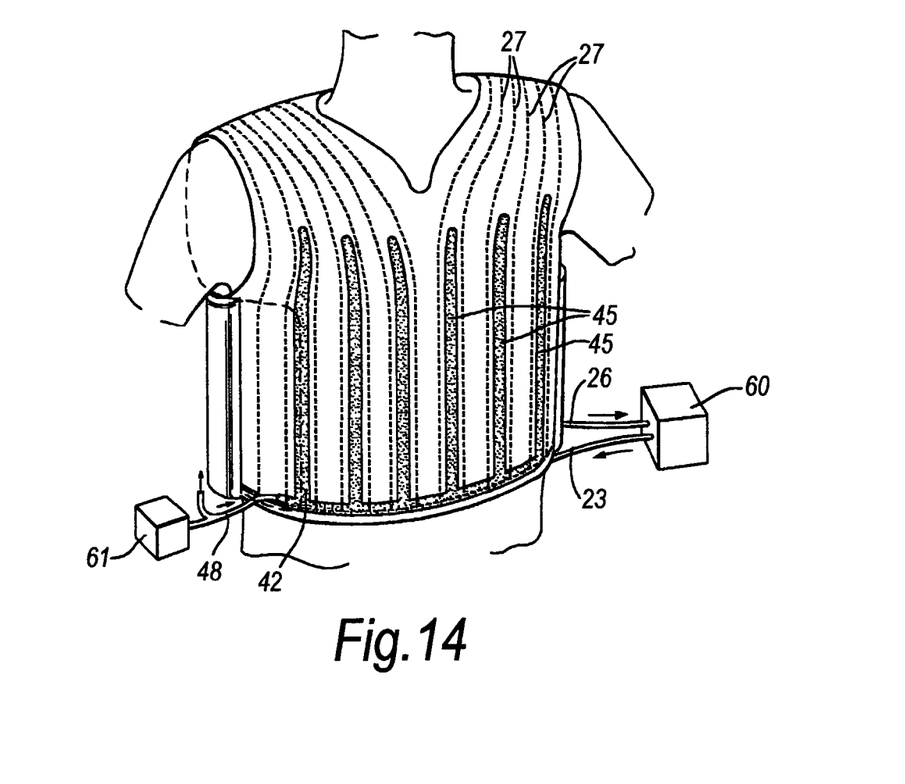
FIG. 14 is a similar view to FIG. 7 but including a third form of chest compression device.
Figure 15:
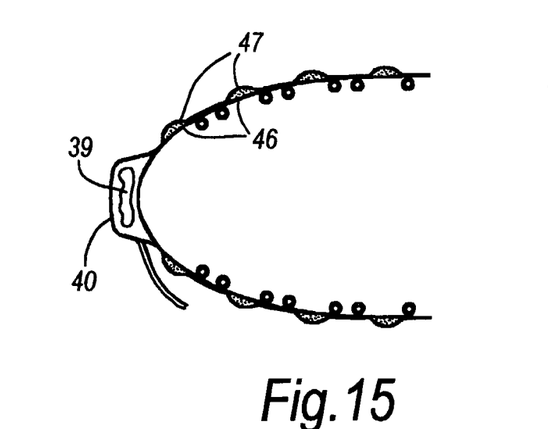
FIG. 15 is a partial cross-section of the conditioning garment of FIG. 14 in an inoperative position.
Figure 16:
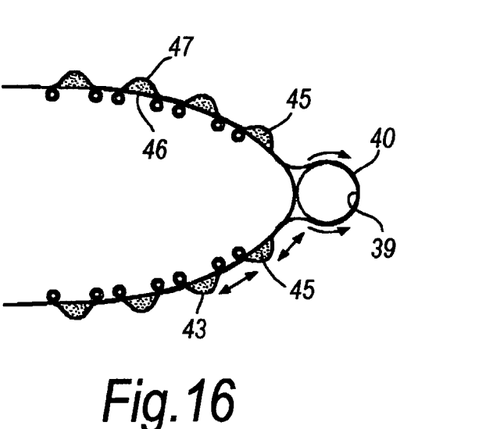
FIG. 16 is a similar view to FIG. 15 but showing the third form of chest compression device in an operative position.

A conditioning garment 10 with a third form of chest compression device is shown in FIGS. 14 to 16. Referring to these Figures, the chest compression device includes a chamber 43 including a portion 44 extending along the lower edges 18, 25 of the front and rear panels 11, 12 and sub-chambers 45 extending up the front panel 11 and the rear panel 12. Each sub-chamber 45 extends between an adjacent pair of conditioning tubes 27. As seen in FIGS. 15 and 16, each sub-chamber 45 is formed from an extensible portion 46 and an inextensible portion 47. The chamber 43 is connected to a supply of gas under pressure 61 (FIG. 14) that is controlled in accordance with sensed or anticipated +G-forces. When increasing +G-forces are sensed or anticipated, gas is supplied through an inlet 48 to the chamber 43 so expanding the sub-chamber 45. The effect of this is to expand the inextensible portion 47 and allow the extensible portion 46 to contract so tightening the conditioning garment 10 around the torso of the wearer.

As seen in FIGS. 15 and 16, the conditioning garment 10 of this embodiment includes also the gas filled tube 39 described above with reference to FIGS. 7 to 9.

Figure 17:
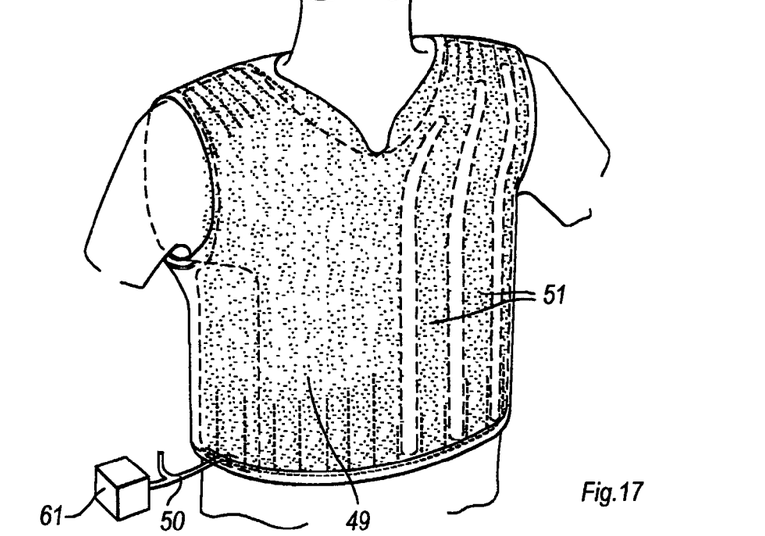
FIG. 17 is a similar view to FIG. 14 but showing a fourth form of chest compression device.
Figure 18:
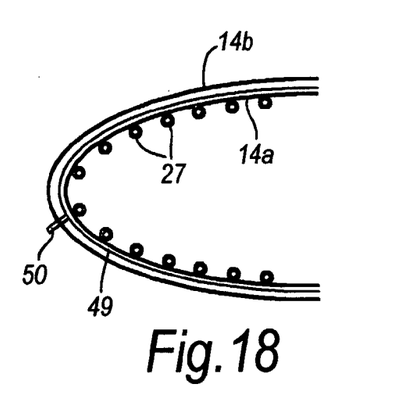
FIG. 18 is a partial cross-sectional view of the garment of FIG. 17 showing the fourth form of chest compression device of FIG. 17 in an inoperative position.
Figure 19:
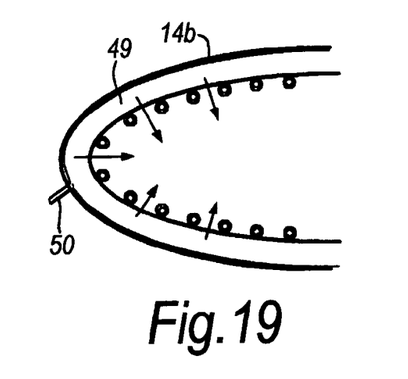
FIG. 19 is a similar view to FIG. 18 but showing the fourth form of chest compression device of FIG. 18 in an operative position.

A conditioning garment 10 including a fourth form of chest compression device is shown in FIGS. 17 to 19. This conditioning garment 10 has the outer layer 14b inextensible. The chest compression device is formed by a chamber 49 extending around the garment 10 between the inner layer 14a and the outer layer 14b. The chamber 49 has an inlet 50 and is connected to a source of gas under pressure 61 as described above with reference to FIGS. 14 to 16. When increased +G-forces are sensed or anticipated, gas under pressure is supplied to the chamber 49 through the inlet 50. Since the outer layer 14a is inextensible, the effect of this is to cause the chamber 49 to force the inner layer 14b against the torso of a wearer. This compresses the torso of a wearer to counteract increased +G-forces.

Figure 20:
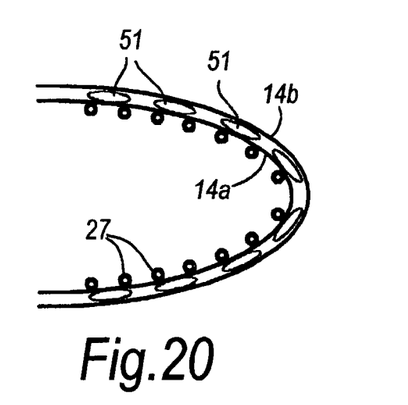
FIG. 20 is a partial cross-sectional view through a conditioning garment of the kind shown in FIG. 17 showing a fifth form of chest compression device, the fifth form of chest compression device being in an inoperative position.
Figure 21:
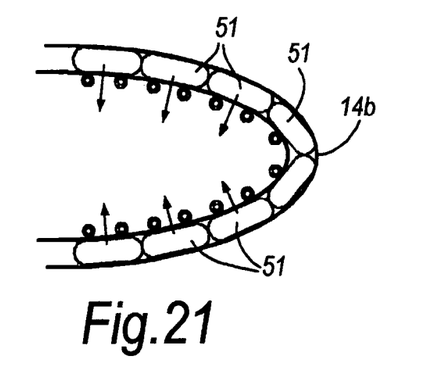
FIG. 21 is a similar view to FIG. 20 but showing the fifth form of chest compression device in an operative position.

As seen in FIGS. 20 and 21 and to the right hand side of FIG. 17, the chamber need not be a single chamber; it could be formed from a plurality of sub-chambers 51. These operate in the same way as the chamber 49 so that when the sub-chambers 51 are expanded by the supply of gas, the chambers 51 push the inner layer 14a against the torso of a wearer to provide chest compression at increased +G-forces.

Figure 22:
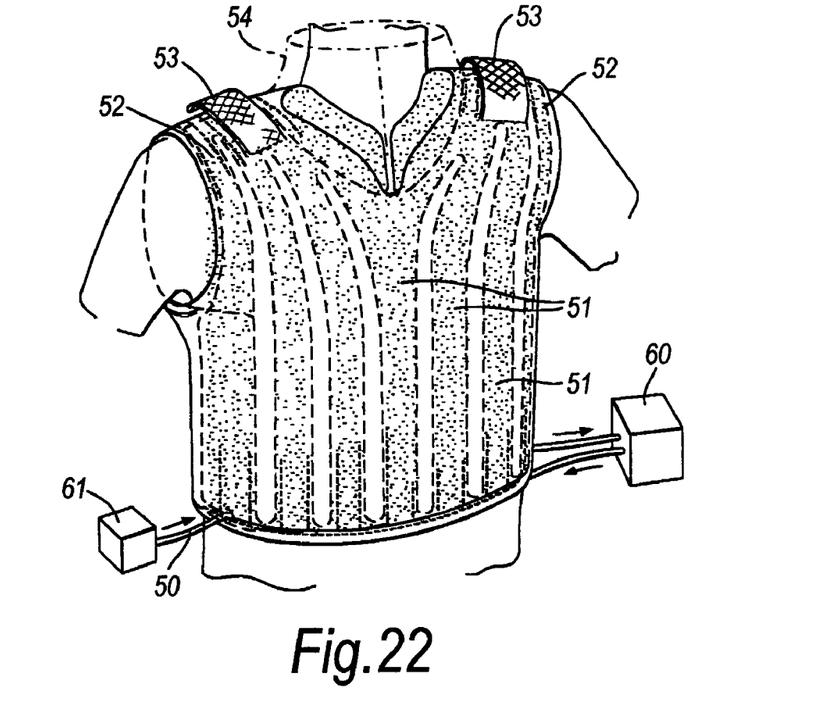
FIG. 22 shows a modified form of the conditioning garment of FIG. 14 and including a neck support and a harness tensioning device.
Figure 23:
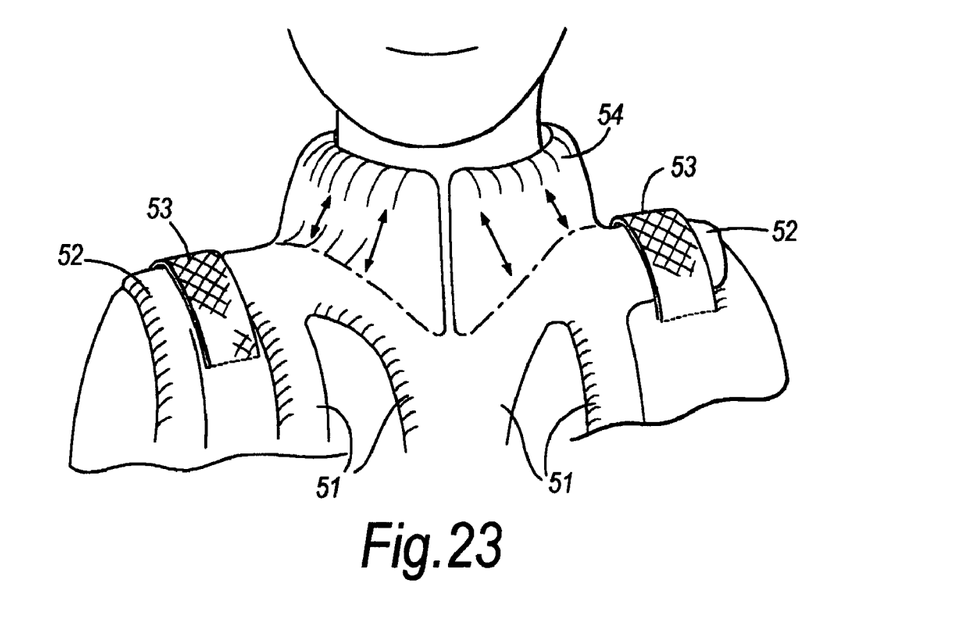
FIG. 23 is an enlarged view of part of FIG. 22 showing the neck support in an operative position and showing, to the left, the harness tensioning device in an inoperative position and, to the right, the harness tensioning device in an operative position.
Figures 25, 26:
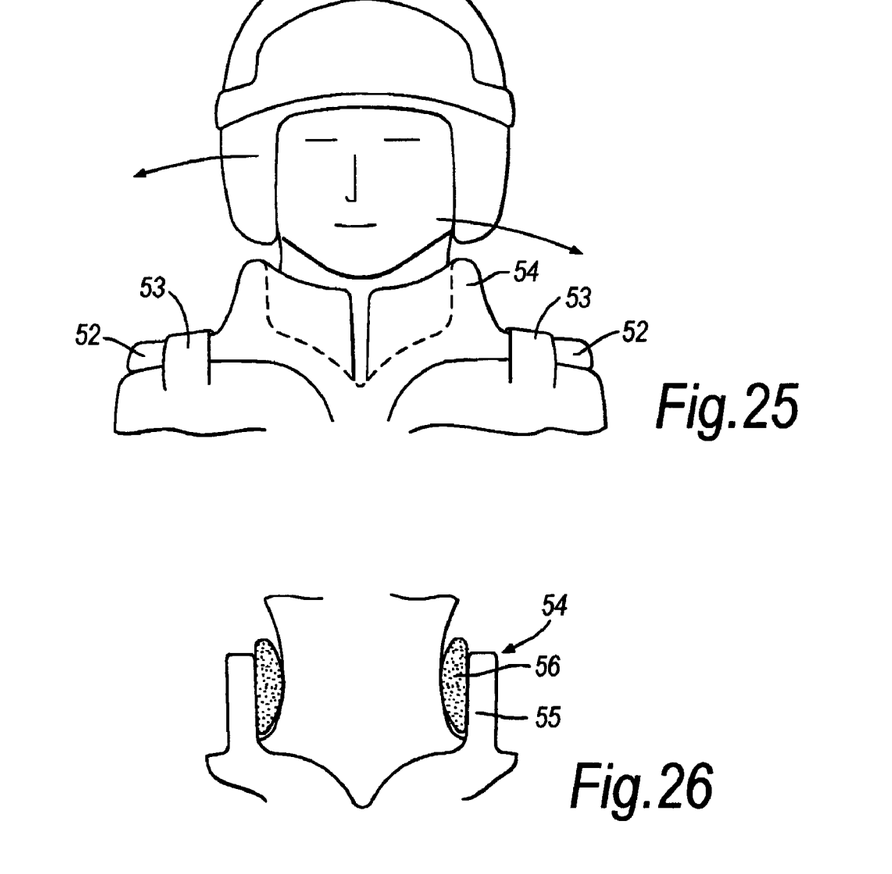
FIG. 25 is a similar view to FIG. 24 but from the front of a wearer.
FIG. 26 is a cross-section through the neck support of FIGS. 24 and 25 showing inner and outer chambers.

Referring next to FIGS. 22 and 26, the conditioning garment 10 shown in FIGS. 20 and 21 and to the right hand of FIG. 17 is modified to provide neck support and a harness tensioning device. In this conditioning garment 10, the sub-chambers 51 are continued up the front panel 11 and the rear panel 12 to connect with tensioning chambers 52 on the shoulders of the garment 10. As seen in FIGS. 22 and 23, the shoulder straps 53 of a harness holding the wearer in the seat of, for example, an aircraft, extend over the shoulders and thus over the collapsed tensioning chambers 52. When gas under pressure is supplied from the source 61 to the sub-chambers 51 from the source 61 when increased +G-forces are sensed, the tensioning chambers 52 inflate and force the shoulder straps 53 away from the shoulders of the wearer. The effect of this is to increase the tension in the shoulder straps 53 and so hold the wearer more securely in the seat.

The tensioning chamber 52 leads to an inflatable collar 54 extending around the neck opening 13. The collar 54 is normally in a collapsed disposition around the neck opening as seen in FIG. 22. When, however, the sub-chambers 51 are supplied with gas under pressure, this gas also enters the collar 54 and raises it to the erect position as shown in FIG. 23.

Figure 24:
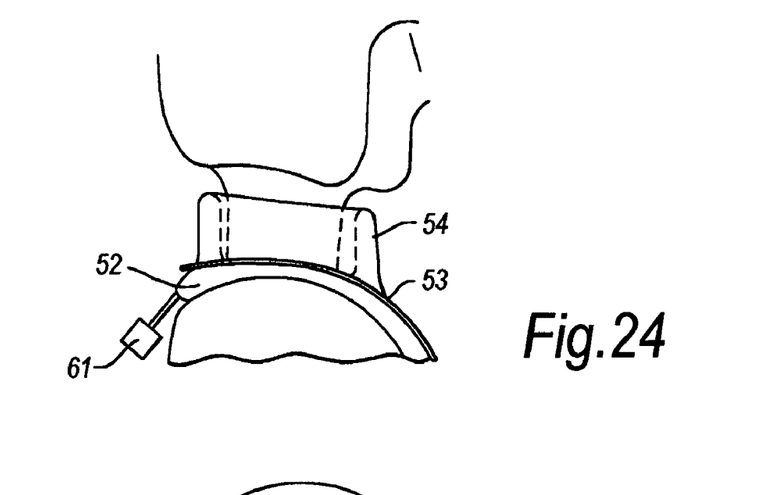
FIG. 24 is a side elevation of the conditioning garment of FIG. 22 with the neck support and the harness tensioning device in respective operative positions.

As seen in FIG. 24, in this position, the collar 54 supports the chin of a wearer and also holds the head of a wearer against lateral movement as seen in FIG. 25. The collar may include an outer portion 55 at higher pressure and a softer inner portion 56 at lower pressure as seen in FIG. 26.

It will be appreciated that any of the chest compression devices, the neck support and the harness tensioning device need not be used with the conditioning garment of FIGS. 1 to 4. They could be used individually or collectively on any other form of conditioning garment.

The invention claimed is:

1. A conditioning garment for covering a torso of a wearer comprising
   a front panel and a rear panel with a neck opening therebetween,
      each panel having a lower edge and
      one of the front and rear panels having an inlet manifold extending across the one of the panels in the region of the lower edge of the one of the panels, the inlet manifold including a plurality of supply ports spaced around the lower edge of the one of the panels, and
      the other of the front and rear panels having an outlet manifold extending across the other of the panels in the region of the lower edge of the other of the panels, the outlet manifold including a plurality of drain ports spaced around the lower edge of the other of the panels, and
   a plurality of tubes extending from the supply ports of the inlet manifold to the drain ports of the outlet manifold over the panels for the passage of fluid through the tubes between the manifolds,
      wherein each tube includes at least two straight portions, one straight portion extending from the inlet manifold to adjacent the neck opening and the other straight portion extending from the outlet manifold to adjacent the neck opening and
      wherein all the tubes are of substantially equal length, the tubes of the respective side of the neck opening being arranged parallel to one another as the tubes extend over the front and rear panels.

2. A garment according to claim 1 wherein the lower edge of each panel extends between respective side edges, each manifold extending across the whole or substantially the whole width of the associated panel between the side edges.

3. A garment according to claim 1 wherein each tube is connected to the inlet and outlet manifolds by a respective supply and drain port, the supply and drain ports of each manifold being equally spaced along the associated inlet and outlet manifolds.

4. A garment according to claim 1 wherein each manifold terminates in an associated terminal connection, the two terminal connections being adjacent one another for connection respectively to a source and sink for fluid for passage between the manifolds along the tubes.

5. A garment according to claim 4 wherein the terminal connections are located to the same one side of the garment.

6. A garment according to claim 4 wherein the terminal connections are located at the centre of an associated panel.

7. A garment according to claim 6 and in which the front and rear panels have respective side edges, each side edge of one panel being connectable to an adjacent side edge of the other panel to hold the garment on a wearer.

8. A garment according to claim 7 wherein the connections at the sides of the garment are releasable.

9. A garment according to claim 7 wherein the connection at one side of the garment is releasable and the connection at the other side of the garment is non-releasable.

10. A garment according to claim 9 wherein the terminal connections are located to the same one side of the garment, and wherein the non-releasable connection is at the side of the garment where the terminal connections are located.

11. A garment according to claim 1 wherein at least one manifold is formed by a strip of flexible material, the strip providing a central passage and the associated plurality of ports, each associated port connecting the passage to an associated tube.

12. A garment according to claim 11 wherein said manifold of flexible material has a first side and a second side, the first side facing outwardly of the associated panel and the second side resting, in use, against a torso of a wearer, the second side being generally flat.

13. A garment according to claim 1 wherein each panel is formed from two layers of material, the tubes being located between said layers and being positioned relative to at least one of said layers.

14. A garment according to claim 13 wherein the two layers are connected together between adjacent tubes to form elongate pockets, each pocket containing an associated tube to locate the tube.

15. A garment according to claim 14 wherein the connection is by stitching or heat welding.

16. A garment according to claim 13 wherein each tube is connected to an associated one of the layers by stitching to locate the tube relative to the layer.

17. A garment according to claim 1 wherein the tubes are expandable at increased +G-forces to tighten the garment around a chest of a wearer to resist chest expansion at such increased +G-forces.

18. A garment according to claim 17 wherein each tube is contained within an associated inextensible outer tube, each tube having a normal collapsed disposition to allow the associated outer tube to spread and increase the circumferential length of the garment but expanding at increased +G-forces to contract the associated outer tube to decrease said circumferential length.

19. A garment according to claim 1 in combination with a chest compression device carried by the garment for compressing the chest of a wearer.

20. A garment according to claim 1 in combination with a neck support for supporting a near of a wearer.

21. A garment according to claim 1 in combination with a harness tensioning device for increasing tensioning in a harness worn by a wearer of the garment.

22. A garment according to claim 1, further including a supply tube connected to the inlet manifold for supplying the fluid to the inlet manifold, and a drain tube connected to the outlet manifold for removing the fluid from the outlet manifold.

* * * * *